US011739599B2

(12) United States Patent
Haymore

(10) Patent No.: US 11,739,599 B2
(45) Date of Patent: Aug. 29, 2023

(54) PROPPANT RECOVERY UNIT

(71) Applicant: BKG Industries, LLC, Stigler, OK (US)

(72) Inventor: Samuel Thomas Haymore, Odessa, TX (US)

(73) Assignee: BKG Industries, LLC, Stigler, OK (US)

( * ) Notice: Subject to any disclaimer, the term of this patent is extended or adjusted under 35 U.S.C. 154(b) by 154 days.

(21) Appl. No.: 17/076,220

(22) Filed: Oct. 21, 2020

(65) Prior Publication Data
US 2022/0120148 A1 Apr. 21, 2022

(51) Int. Cl.
E21B 21/06 (2006.01)
E21B 21/01 (2006.01)
B01D 29/27 (2006.01)
B01D 35/027 (2006.01)

(52) U.S. Cl.
CPC ............ *E21B 21/065* (2013.01); *B01D 29/27* (2013.01); *B01D 35/0276* (2013.01); *E21B 21/01* (2013.01); *B01D 2221/04* (2013.01)

(58) Field of Classification Search
None
See application file for complete search history.

(56) References Cited

U.S. PATENT DOCUMENTS

| 142,238 A | * | 8/1873 | Jenings | E03F 9/002 |
| | | | | 210/170.03 |
| 530,816 A | * | 12/1894 | Wright | E02D 29/12 |
| | | | | 210/247 |
| 658,639 A | * | 9/1900 | Guion | E03F 5/046 |
| | | | | 210/317 |
| 788,833 A | * | 5/1905 | Jackson | B01D 35/12 |
| | | | | 71/21 |
| 809,201 A | * | 1/1906 | Lutz | E03F 1/00 |
| | | | | 210/317 |
| 1,115,016 A | * | 10/1914 | Pheils | B65F 1/1447 |
| | | | | 193/11 |
| 1,140,225 A | * | 5/1915 | Wilson | E21B 27/02 |
| | | | | 166/162 |
| 1,178,355 A | * | 4/1916 | Stein | B01D 29/15 |
| | | | | 294/68.21 |
| 1,207,776 A | * | 12/1916 | McDonald | B04B 11/04 |
| | | | | 210/324 |
| 1,404,667 A | * | 1/1922 | Stevens | B01D 24/12 |
| | | | | 210/323.2 |

(Continued)

*Primary Examiner* — Robert J Popovics
(74) *Attorney, Agent, or Firm* — Dunlap Codding, P.C.

(57) ABSTRACT

An apparatus and method for separating solid matter from liquid matter includes a container, a gas buster, a trough, a winch, and a filter. The gas buster is positioned above the container to dissipate energy associated with incoming solid matter and liquid matter. The trough is positioned below an outlet of the gas buster and has a bottom sloping from a high end to a low end with an opening at the low end. The filter is positionable below the opening of the trough in a way that the solid matter and the liquid matter passing from the opening of the trough enter the filter wherein the liquid matter passes through the filter and into the container and the solid matter is collected in the filter. The filter is removable from the container to permit the amount of solid matter collected in the filter to be determined.

12 Claims, 8 Drawing Sheets

(56) References Cited

U.S. PATENT DOCUMENTS

| | | | | |
|---|---|---|---|---|
| 1,690,700 A * | 11/1928 | Petersen | ............. | F04B 53/1037 210/237 |
| 1,746,121 A * | 2/1930 | Levy | ................ | E03F 5/14 210/237 |
| 1,774,793 A * | 9/1930 | Egan | .................... | E03F 5/0401 210/534 |
| 1,830,714 A * | 11/1931 | Palmer | .................. | E03F 5/046 210/299 |
| 1,894,031 A * | 1/1933 | Edwords | .................. | E03F 5/14 210/299 |
| 2,102,310 A * | 12/1937 | Egan | .................... | E03F 5/0404 210/247 |
| 2,414,487 A * | 1/1947 | Schuttler | .................. | B07B 1/50 210/474 |
| 2,710,071 A * | 6/1955 | Kinser | .................. | E21B 43/36 137/122 |
| 3,228,174 A * | 1/1966 | Perry | ................ | B01D 19/0052 55/484 |
| 3,322,282 A * | 5/1967 | Lyman | ................ | A47L 15/4206 210/418 |
| 3,547,190 A * | 12/1970 | Wilkerson | ................ | C02F 1/20 166/267 |
| 3,646,730 A * | 3/1972 | Reid | ....................... | B01D 46/72 55/504 |
| 3,746,167 A | 7/1973 | Arthur | | |
| 3,777,405 A * | 12/1973 | Crawford | .................. | F26B 3/08 34/591 |
| 3,782,463 A * | 1/1974 | Palmour | ................ | E21B 43/34 166/105.5 |
| 3,888,644 A * | 6/1975 | Holland | ................ | B01D 46/00 55/318 |
| 4,090,523 A * | 5/1978 | Kelly, Jr. | ................ | E21B 21/08 134/22.12 |
| 4,180,391 A * | 12/1979 | Perry, Jr. | ................ | B01D 45/16 55/424 |
| 4,297,116 A * | 10/1981 | Cusick | ............... | B01D 46/0031 55/528 |
| 4,411,779 A * | 10/1983 | McConnell, III | .... | B01D 24/007 210/275 |
| 4,636,308 A * | 1/1987 | Summers | ............... | E21B 21/063 210/523 |
| 4,639,258 A * | 1/1987 | Schellstede | .......... | B01D 33/275 96/204 |
| 4,661,127 A * | 4/1987 | Huntley | .................. | E21B 43/36 166/267 |
| 4,704,899 A | 11/1987 | Burr et al. | | |
| 4,779,677 A * | 10/1988 | Cobb | ....................... | E21B 43/34 166/267 |
| 5,030,259 A * | 7/1991 | Bryant | ................... | B01D 50/20 15/340.1 |
| 5,149,344 A * | 9/1992 | Macy | ................ | B01D 17/0208 96/182 |
| 5,178,752 A * | 1/1993 | McKinnon | .............. | B01D 29/27 210/474 |
| 5,199,997 A * | 4/1993 | Stowe | ....................... | B03B 9/02 134/40 |
| 5,256,171 A * | 10/1993 | Payne | .................... | E21B 43/34 95/212 |
| 5,480,547 A * | 1/1996 | Williamson | ......... | B01D 17/045 210/DIG. 5 |
| 5,636,871 A * | 6/1997 | Field | ....................... | B65D 33/00 114/361 |
| 5,718,298 A * | 2/1998 | Rusnak | ................. | E21B 21/063 166/267 |
| 5,858,218 A * | 1/1999 | Setlock | ................ | B01D 29/945 210/197 |
| 5,900,137 A * | 5/1999 | Homan | .................. | E21B 21/06 175/48 |
| 5,919,284 A * | 7/1999 | Perry, Jr. | ................ | B01D 45/02 55/482 |
| 5,928,519 A * | 7/1999 | Homan | ............. | B01D 21/0042 175/48 |
| 6,001,242 A * | 12/1999 | England | ................. | B01D 29/52 210/194 |
| 6,149,803 A * | 11/2000 | DiLoreto, Jr. | ......... | B01D 29/96 210/170.03 |
| 6,168,647 B1 * | 1/2001 | Perry, Jr. | ................ | B01D 46/64 95/286 |
| 6,179,070 B1 * | 1/2001 | Dietzen | .................. | B63B 27/29 175/207 |
| 6,179,071 B1 * | 1/2001 | Dietzen | .................. | E21B 41/005 175/207 |
| 6,254,770 B1 * | 7/2001 | Remon | ................ | E03F 5/0404 210/163 |
| 6,521,122 B1 * | 2/2003 | Elliot | ................ | E03F 5/0404 210/170.03 |
| 6,537,447 B2 * | 3/2003 | Remon | ................ | E02D 29/12 210/163 |
| 6,749,746 B2 * | 6/2004 | Mokrzycki | ............ | B01D 36/04 210/170.03 |
| 7,014,685 B2 * | 3/2006 | Burns | .................. | B01D 29/114 55/482 |
| 7,040,418 B2 * | 5/2006 | Slater | .................... | E21B 41/005 175/207 |
| 7,108,738 B2 * | 9/2006 | Burns | .................. | B01D 29/114 55/482 |
| 7,198,659 B1 * | 4/2007 | Fanguy | ............. | B01D 19/0042 55/342 |
| 7,658,857 B2 * | 2/2010 | Wacome | ................ | E03F 5/0404 210/170.03 |
| 7,883,620 B2 * | 2/2011 | Owen | ....................... | E03C 1/26 210/91 |
| 7,959,799 B2 * | 6/2011 | Happel | ............... | B01D 21/0012 210/166 |
| 7,981,300 B2 * | 7/2011 | Wacome | ................ | E03F 5/0401 210/170.03 |
| 8,152,911 B1 * | 4/2012 | Williams | ........... | B01D 17/0208 96/194 |
| 8,377,301 B2 | 2/2013 | Miller | | |
| 8,449,779 B2 * | 5/2013 | Thompson | ........... | B65G 33/265 210/523 |
| 8,460,443 B2 * | 6/2013 | Seitz | ....................... | B01D 46/71 55/428 |
| 8,517,167 B2 * | 8/2013 | Thompson | .............. | B65G 41/00 209/31 |
| 8,608,956 B2 * | 12/2013 | Moulton | .................. | E03F 5/14 210/473 |
| 8,622,135 B2 * | 1/2014 | Smartt | ................... | B01D 19/00 166/308.1 |
| 8,821,725 B2 * | 9/2014 | Weston | .................. | B03B 9/063 137/574 |
| 8,844,650 B2 * | 9/2014 | Saiz | ......................... | E21B 21/06 175/207 |
| 8,906,232 B2 * | 12/2014 | McInnis | ................ | E03F 5/14 210/170.03 |
| 8,936,661 B2 * | 1/2015 | Burns | ................ | B01D 46/2414 55/482 |
| 9,034,086 B2 * | 5/2015 | Daniels | ............. | B01D 17/0217 96/188 |
| 9,169,087 B2 * | 10/2015 | Mackenzie | ........... | E21B 21/065 |
| 9,194,116 B2 * | 11/2015 | Bailey | .................... | E03F 5/0404 |
| 9,297,246 B2 | 3/2016 | Smartt et al. | | |
| 9,322,156 B2 * | 4/2016 | McInnis | ................. | E03F 5/0403 |
| 9,327,214 B2 * | 5/2016 | Hemstock | ............... | E21B 27/00 |
| 9,498,739 B2 * | 11/2016 | Thompson | ................ | E21B 21/065 |
| 9,597,614 B2 * | 3/2017 | Thompson | ........... | B65G 33/265 |
| 9,687,761 B2 * | 6/2017 | Thompson | ........... | B65G 33/265 |
| 9,738,545 B2 * | 8/2017 | Duesel, Jr. | ............ | E21B 43/26 |
| 9,802,689 B2 * | 10/2017 | Hudson | ................ | B63H 21/386 |
| 9,815,012 B2 * | 11/2017 | Cloud | ................... | B01D 46/2411 |
| RE46,632 E * | 12/2017 | Saiz | ...................... | E21B 21/01 |
| 9,962,630 B2 * | 5/2018 | Cox | ..................... | B01D 19/0042 |
| 9,982,418 B2 * | 5/2018 | Bennett | .................. | E03F 7/095 |
| 10,023,381 B2 * | 7/2018 | Bataille | ................ | B65G 69/182 |
| 10,036,217 B2 * | 7/2018 | Munisteri | ............... | E21B 43/40 |
| 10,094,184 B2 * | 10/2018 | Cox | ....................... | E21B 21/067 |
| 10,112,136 B2 * | 10/2018 | Morris | ................... | B23Q 11/0067 |
| 10,435,966 B2 * | 10/2019 | Leuchtenberg | ....... | E21B 21/067 |
| 10,465,371 B2 * | 11/2019 | Wacome | ................ | E03F 5/0404 |

(56) References Cited

U.S. PATENT DOCUMENTS

| | | | |
|---|---|---|---|
| 10,508,430 B2* | 12/2019 | Riley | B01D 29/27 |
| 10,526,134 B2* | 1/2020 | Bataille | B65D 88/30 |
| 10,702,802 B1* | 7/2020 | Weber | B01D 21/2444 |
| 10,751,654 B1* | 8/2020 | Kulbeth | B01D 21/2494 |
| 10,801,312 B2* | 10/2020 | Hu | E21B 41/0092 |
| 10,807,022 B2* | 10/2020 | Bollom | B01D 21/2461 |
| 10,857,488 B1* | 12/2020 | Kulbeth | B01D 21/2472 |
| 10,967,300 B2* | 4/2021 | Drake | B01D 19/00 |
| 11,040,300 B1* | 6/2021 | Kulbeth | B01D 19/0068 |
| 11,148,071 B2* | 10/2021 | Kelsey | B01D 17/045 |
| 11,167,324 B2* | 11/2021 | Davis | B08B 3/123 |
| 11,173,425 B1* | 11/2021 | Kulbeth | B01D 21/245 |
| 11,198,998 B1* | 12/2021 | Zung | E03F 1/001 |
| 11,219,845 B1* | 1/2022 | Kulbeth | B01D 33/03 |
| 11,219,846 B1* | 1/2022 | Kulbeth | B01D 21/302 |
| 11,326,406 B1* | 5/2022 | Kulbeth | E21B 43/40 |
| 11,435,221 B1* | 9/2022 | Metcalf | E21B 21/01 |
| 11,492,859 B2* | 11/2022 | Bollom | E21B 21/067 |
| 2001/0030150 A1* | 10/2001 | Remon | E03F 1/00 |
| | | | 210/163 |
| 2003/0106713 A1* | 6/2003 | Slater | E21B 41/005 |
| | | | 175/5 |
| 2004/0020860 A1 | 2/2004 | Schmigel et al. | |
| 2004/0128903 A1* | 7/2004 | Wexler | A01M 29/34 |
| | | | 43/122 |
| 2005/0183997 A1* | 8/2005 | Happel | E03F 5/0404 |
| | | | 210/163 |
| 2006/0045641 A1* | 3/2006 | Anderson | B23Q 11/0067 |
| | | | 74/609 |
| 2008/0006304 A1* | 1/2008 | Treherne | B01D 21/2488 |
| | | | 210/194 |
| 2008/0210607 A1* | 9/2008 | Owen | E03C 1/26 |
| | | | 210/138 |
| 2009/0173699 A1* | 7/2009 | Wacome | E03F 5/0404 |
| | | | 210/170.03 |
| 2010/0133201 A1* | 6/2010 | Wacome | E03F 5/0404 |
| | | | 210/170.03 |
| 2011/0061989 A1* | 3/2011 | Thompson | B65G 33/14 |
| | | | 198/671 |
| 2011/0174693 A1* | 7/2011 | Rabe | C10G 33/04 |
| | | | 210/207 |
| 2011/0180266 A1* | 7/2011 | Elmbo | E21B 7/02 |
| | | | 114/261 |
| 2011/0215058 A1* | 9/2011 | Thompson | E21B 21/065 |
| | | | 210/512.3 |
| 2012/0067807 A1* | 3/2012 | Lappeman | B01D 35/027 |
| | | | 210/301 |
| 2012/0080191 A1* | 4/2012 | Smartt | E21B 43/267 |
| | | | 166/308.1 |
| 2012/0145612 A1* | 6/2012 | McInnis | E03F 5/0403 |
| | | | 210/163 |
| 2012/0210688 A1* | 8/2012 | Burns | B01D 46/64 |
| | | | 55/483 |
| 2012/0325751 A1* | 12/2012 | Renick | E21B 43/26 |
| | | | 210/85 |
| 2013/0015115 A1* | 1/2013 | Landis | C02F 1/5281 |
| | | | 210/205 |
| 2013/0015141 A1* | 1/2013 | Landis | E21B 21/065 |
| | | | 210/710 |
| 2013/0048575 A1* | 2/2013 | Gruber | C02F 1/24 |
| | | | 210/207 |
| 2013/0186622 A1* | 7/2013 | Thompson | B65G 33/265 |
| | | | 166/267 |
| 2013/0186811 A1* | 7/2013 | Kaiser | E03F 5/0404 |
| | | | 210/163 |
| 2013/0199987 A1* | 8/2013 | Morris | B01D 35/0273 |
| | | | 210/323.1 |
| 2014/0054236 A1* | 2/2014 | Bennett | E03B 7/095 |
| | | | 210/170.03 |
| 2014/0130676 A1* | 5/2014 | Daniels | B01D 19/0042 |
| | | | 96/194 |
| 2014/0174719 A1* | 6/2014 | Smartt | E21B 43/34 |
| | | | 166/105.4 |
| 2014/0216256 A1* | 8/2014 | Hemstock | E21B 27/00 |
| | | | 96/155 |
| 2014/0238915 A1* | 8/2014 | McInnis | E03F 5/0404 |
| | | | 210/170.03 |
| 2015/0122498 A1* | 5/2015 | Duesel, Jr. | C02F 1/048 |
| | | | 166/305.1 |
| 2016/0009489 A1* | 1/2016 | Lofton | B65D 90/046 |
| | | | 137/544 |
| 2016/0059168 A1* | 3/2016 | Bataille | B65D 88/30 |
| | | | 96/416 |
| 2016/0256799 A1* | 9/2016 | Thompson | B65G 33/265 |
| 2016/0375386 A1 | 12/2016 | Magnus et al. | |
| 2017/0009541 A1* | 1/2017 | Cox | B01D 19/0042 |
| 2017/0145802 A1* | 5/2017 | Thompson | B01D 21/2461 |
| 2017/0233262 A1* | 8/2017 | Duesel, Jr. | B01D 1/14 |
| | | | 210/179 |
| 2017/0252674 A1* | 9/2017 | Thompson | B65G 33/10 |
| 2018/0193773 A1* | 7/2018 | Thompson | B65G 33/265 |
| 2018/0223611 A1* | 8/2018 | Cox | E21B 21/02 |
| 2018/0319585 A1* | 11/2018 | Bataille | B65G 69/182 |
| 2019/0060794 A1* | 2/2019 | Drake | B01D 21/0006 |
| 2019/0060804 A1* | 2/2019 | Morris | B01D 35/0273 |
| 2019/0143380 A1* | 5/2019 | Davis | B65G 45/22 |
| | | | 134/65 |
| 2019/0226193 A1* | 7/2019 | Deurloo | E03F 5/0404 |
| 2019/0292766 A1* | 9/2019 | Riley | B01D 29/23 |
| 2020/0101403 A1* | 4/2020 | Bollom | B01D 21/2488 |
| 2021/0031134 A1* | 2/2021 | Bollom | B01D 21/2488 |
| 2022/0023919 A1* | 1/2022 | Davis | E21B 43/34 |
| 2022/0024368 A1* | 1/2022 | Smith | B60G 3/225 |
| 2022/0120148 A1* | 4/2022 | Haymore | E21B 21/065 |
| 2022/0268134 A1* | 8/2022 | Stout | C02F 11/128 |

* cited by examiner

PROPPANT RECOVERY UNIT

BACKGROUND

Hydrocarbon production increasingly relies on hydraulic fracturing as a completion process to stimulate production from formations. Hydraulic fracturing involves high-pressure injection of large quantities of water along with proppants, such as sand, and chemical additives, into a well. The high-pressure water creates small fractures, or cracks, in the surrounding rock formation, and sand or other proppant used wedges into the cracks and prevents them from closing once the water pressure is removed. These cracks allow hydrocarbon entrapped in the formation to escape and be recovered at the wellhead, and ultimately sold to consumers.

Upon completion of a hydraulic fracking process in a well, as a result of discontinuing the high-pressure water injection a large portion of the injected water (from several thousand to millions of gallons) is recovered at the wellhead as flowback water. Such flowback water typically contains liquid hydrocarbons, gases dissolved in the water due to the high-pressures in the well, other organic or non-organic components, and solids which may include the proppant injected in the well, as well as sand/sediment, drill cuttings, and soil, washed up by the flowback water.

While such techniques are very effective at ultimately increasing the flow of hydrocarbons from a minimally porous formation, they create immediate challenges that must be met. In particular, the large quantities of water, sand, and other liquid and particulate additives that are injected into the formation during fracking eventually must be allowed to flow out of the formation. Also, since the well bore is passing horizontally through a fractured formation, the amount of particulate matter falling out from the formation itself is much greater than would be encountered with a vertical well or from an unfractured formation. The vast majority of the water and sand eventually will pass out of the well and the stream flowing from the production well will be relatively clean to natural gas. During the initial phase of production from such wells, however, the stream is typically a liquid dispersion containing not only natural gas, but also large quantities of water, sand, and any other additives that were injected into the well during fracking. That water and sand must be removed in order to process the natural gas and render it suitable for distribution and use.

Conventional apparatus, commonly referred to as sand separators, are used to remove a large majority of the sand/proppant. A production stream is introduced at the upper end of the vessel through an inlet port. The interior of the vessel is sized to allow the production stream to experience a sufficiently large velocity drop such that natural gas will separate. After the separator is filled with sand/proppant, the sand/proppant is removed and disposed of. It would be useful to be able to determine the amount of sand/proppant contained in the flowback water so it could be determined the amount of sand/proppant remaining in the well. The water and sand components of the stream are allowed to exit the bottom of the vessel through the drain while the gas rises back to the top of the vessel and eventually out of the vessel via a gas port.

While such conventional sand separators have been generally effective at removing large quantities of sand, they do not allow for the determination of the quantity of sand that has been removed. To this end, a need exists for a method and separator assembly for recovering large volumes of sand/proppant inherent in hydraulic fracturing operations in a way that the quantity of sand/proppant may be determined.

It is to such a method and separator assembly that the inventive concepts disclosed herein are directed.

BRIEF DESCRIPTION OF THE DRAWINGS

Like reference numerals in the figures represent and refer to the same or similar element or function. Implementations of the inventive concepts disclosed herein may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
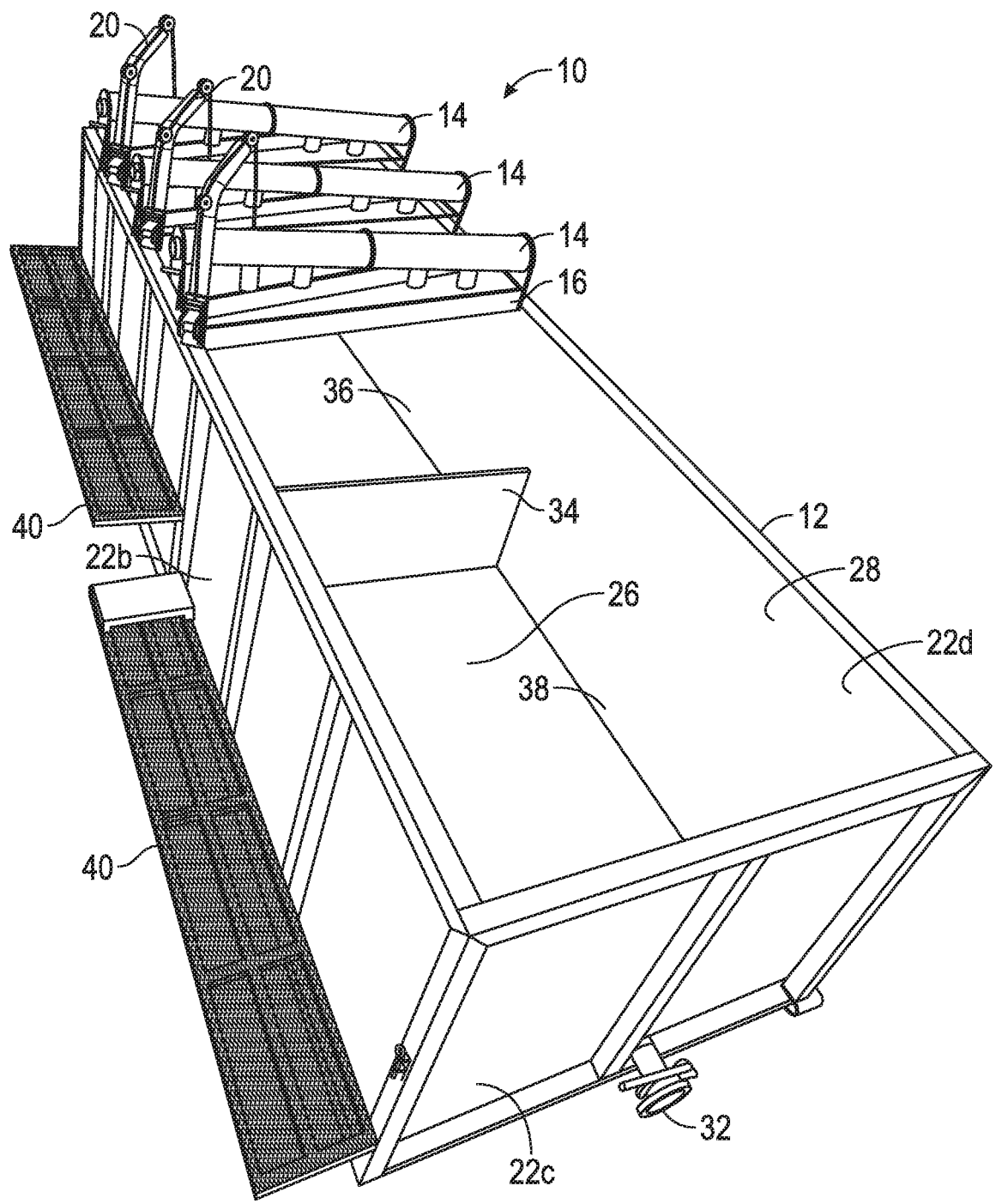
FIG. 1 is a top perspective view of a proppant recovery unit constructed in accordance with the inventive concepts disclosed herein.

The inventive concepts disclosed herein are generally directed to an apparatus for separating solid matter from liquid matter. The apparatus includes a container with an inner space; a gas buster, a trough, a winch, and a filter. The gas buster is connected to the container and positioned above the inner space thereof to dissipate energy associated with incoming solid matter and liquid matter. The gas buster has at least one inlet and at least one outlet. The trough is positioned below the at least one outlet of the gas buster and is supported by the container. The trough has a bottom sloping from a high end to a low end and an opening at the low end. The winch is connected to the container. The filter has an inlet and is operably connected to the winch so the inlet of the sand filter is positionable below the opening of the trough in a way that the solid matter and the liquid matter passing from the opening of the trough enter the filter wherein the liquid matter passes through the filter and into the container and the solid matter is collected in the filter. The winch is operable to cause the filter to be removed from the container to permit the amount of solid matter collected in the filter to be determined.

In another aspect, the inventive concepts disclosed herein are directed to a method for separating and treating solids from fluid. The method includes introducing a fluid having a solid matter and a liquid matter into a gas buster to dissipate energy associated with incoming solid matter and liquid matter. The gas buster has an inlet and at least one outlet. The solid matter and the liquid matter are passed from the gas buster into a trough having a bottom sloping from a high end to a low end. The bottom has an opening at the low end. The solid matter and the liquid matter are from the trough through the opening and into a filter positioned in a container so the liquid matter passes through the filter and into the container and the solid matter is collected in the filter. The filter is removed from the container, and the amount of solid matter collected in the filter is determined.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description only and should not be regarded as limiting the inventive concepts disclosed and claimed herein in any way.

In the following detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., 134a-n). Similarly, a letter following a reference numeral is intended to reference an embodiment of the feature or element that may be similar, but not necessarily identical, to a previously described element or feature bearing the same reference numeral (e.g., 148, 148a, 148b, etc.). Such shorthand notations are used for purposes of clarity and convenience only, and should not be construed to limit the instant inventive concepts in any way, unless expressly stated to the contrary.

Further, unless expressly stated to the contrary, "or" refers to an inclusive "or" and not to an exclusive "or." For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Figure 2:
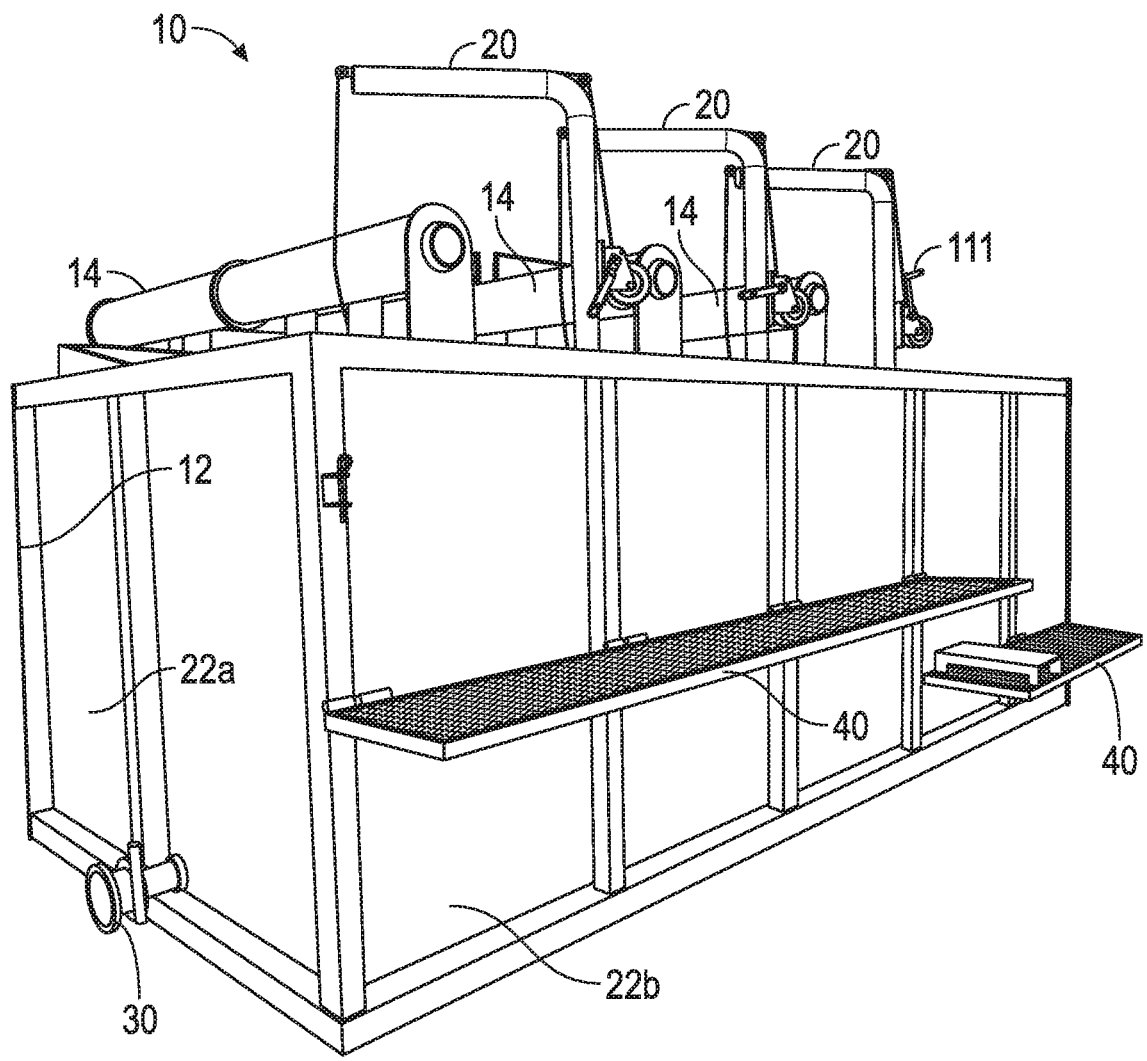
FIG. 2 is bottom perspective view of the proppant recovery unit.
Figure 3:
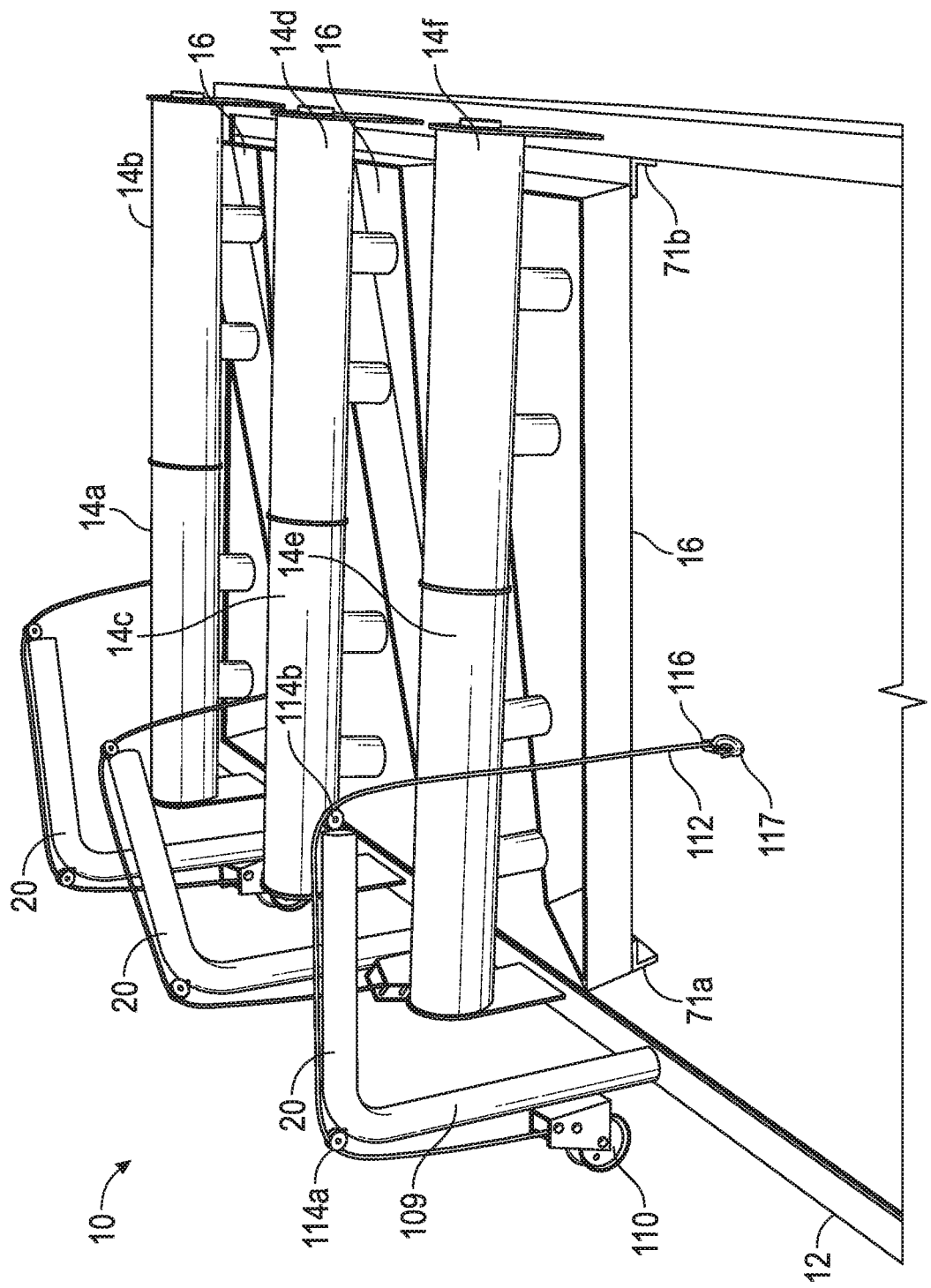
FIG. 3 is an enlarged perspective view of the proppant recovery unit.

Referring now to the drawings, and more particularly to FIGS. 1-3, shown therein is an apparatus 10 constructed in accordance with the inventive concepts disclosed herein. The apparatus 10 is designed to handle large volumes of flowback water recovered from a well site upon hydraulic fracture completion. The apparatus 10 provides for recovering large volumes of sand/proppant inherent in hydraulic fracturing operations in a way that the quantity of sand/proppant may be determined. Generally, the apparatus 10 includes a container 12, at least one gas buster 14, at least one trough 16, at least one filter assembly 18, and at least one winch 20.

The apparatus 10 may be designed to be moved from one well site to another via a trailer (not shown). Further, the apparatus 10 may be transported with conventional means (e.g., trucks, trailers) and may be permanently or semi-permanently installed at a well site, for example. Further, the apparatus 10 may be mounted on a skid (not shown), or a railroad car (not shown), or may be loaded onto a truck and moved in variety of ways as will be understood by persons of ordinary skill in the art. The apparatus 10 may also be permanently or semi-permanently installed at any suitable location, such as a well site. The apparatus 10 may be disassembled for transport or storage, and may be transported and assembled at any desired location, as will be understood by persons of ordinary skill in the art having the benefit of the instant disclosure.

During the flowback stage of the hydraulic fracturing process, the apparatus 10 may be connected to the solids discharge of a sand separator (not shown), or some other vessel, so that sand/proppant discharged from the sand separator enters the apparatus 10.

The container 12 is provided with a plurality of walls 22a-22d and a bottom 26. The container 14 is constructed of steel, although any number of other materials may likewise be utilized, for example, a resin or plastic polymer, metal (such as steel, titanium, aluminum or blends thereof), fiber or glass-based materials and combinations thereof. The walls 22a-22d cooperate with the bottom 26 to form an inner space 28 for receiving and hold fluids therein. The volume of the inner space 28 may be varied. In one embodiment, the inner space 28 may have a volume of at least 130 barrels, and more particularly, a volume of about 250 barrels.

The container 12 may have a first outlet 30 in one of the walls (e.g., wall 22a and a second outlet 32 in another one of the walls (e.g., wall 22c). The container 12 may have at least one weir 34 dividing the inner space 28 into a first portion 36 and a second portion 38 with the first outlet 30 being in the first portion 36 and the second outlet being in the second portion 38. The weir 34 functions to separate solids from the water collected in the second portion 38 of the inner space 28.

The container 12 may be provided with one or more platforms 40 to facilitate operations of the apparatus 10.

The gas busters 14 are connected to the container 12 and positioned above the inner space 28 thereof to dissipate energy associated with incoming solid matter and liquid matter. The apparatus 10 is illustrated as having six gas busters 14a-14f (FIG. 3). To this end, the apparatus 10 may be connected to six different wells. It will be appreciated that any number of gas busters may be incorporated into the apparatus 10. For example, one, two, three, four, five, six, or more.

Figure 4A:
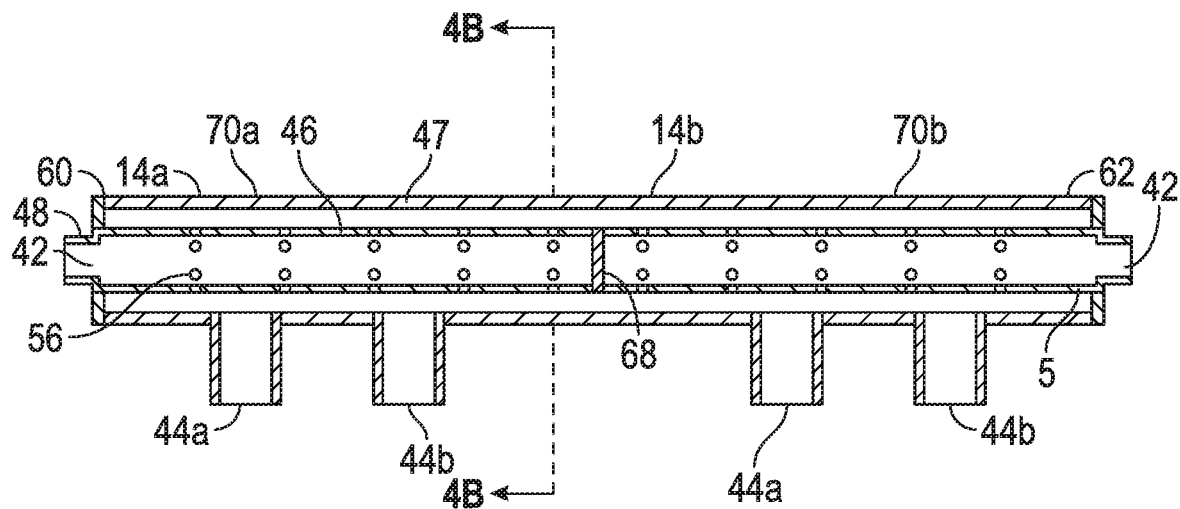
FIG. 4A is a cross sectional view of a gas buster.
Figure 4B:
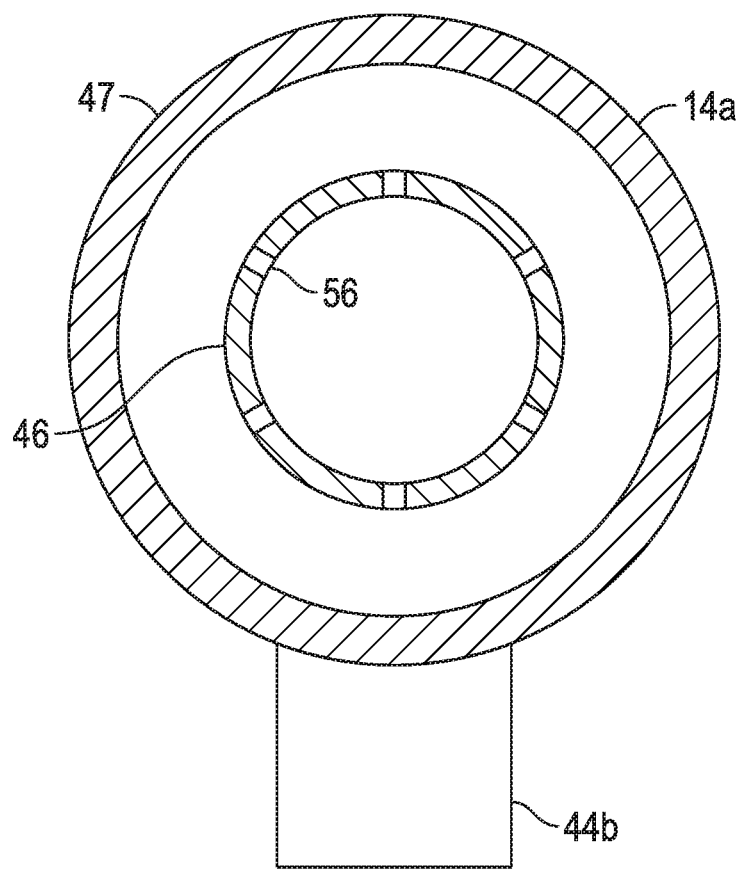
FIG. 4B is a sectional view taken along lines 4B-4B of FIG. 4A.
Figure 5:
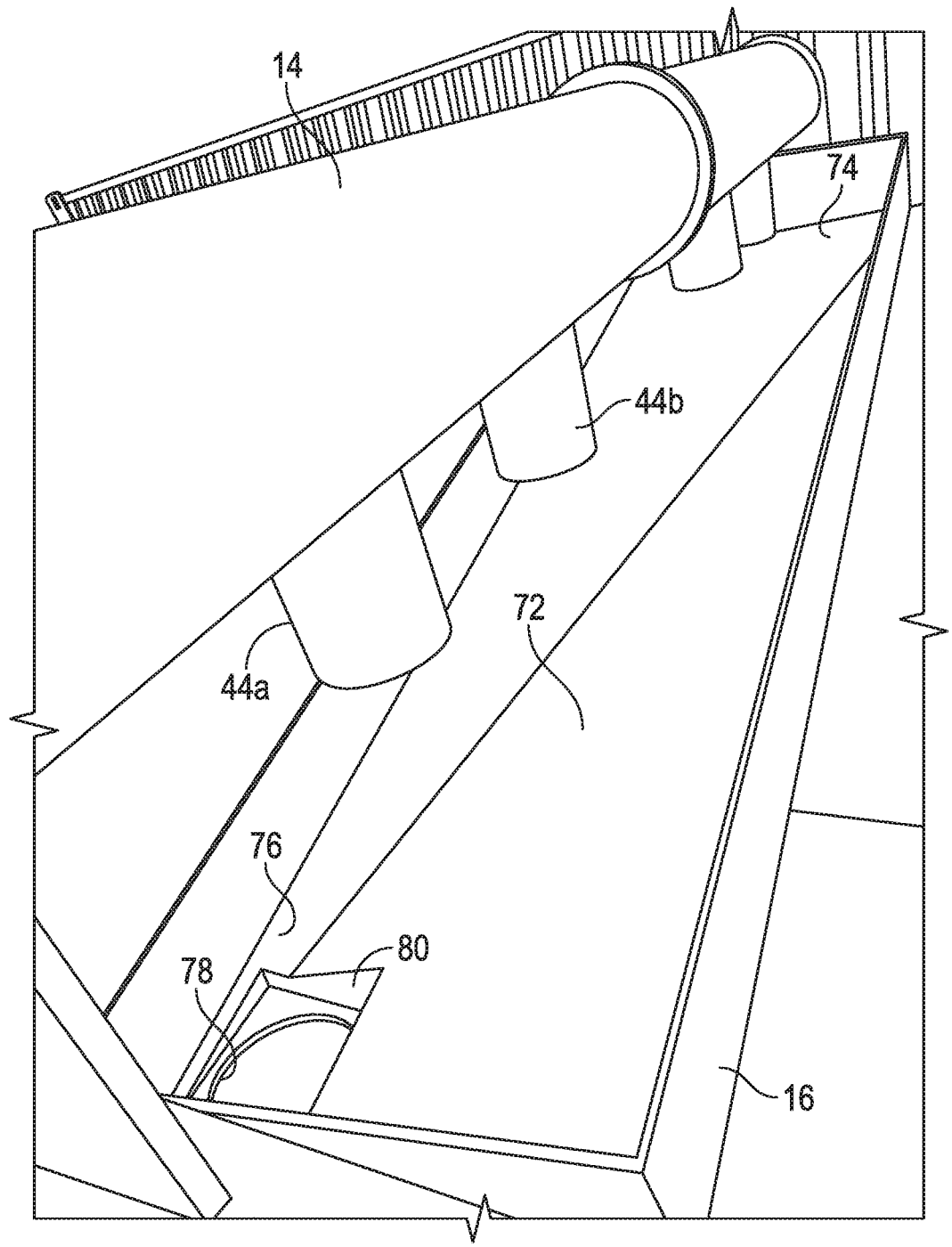
FIG. 5 is a top view of a portion of the trough illustrating an opening therethrough.

Referring to FIGS. 4A and 4B, each of the gas busters 14 have at least one inlet 42 and at least one outlet 44. The gas busters 14a-14d are illustrated as having two outlets 44a and 44b. Each of the gas busters includes a first pipe section 46 and a second pipe section 47. The first pipe section 46 has a first end 48, a second end 50, a length, and a diameter. The inlet 42 of the gas buster 14a is formed at the first end 48 of the first pipe section 46, and the inlet 42 of the gas buster 14b is formed at the second end 50. The first pipe section 46 has a plurality of openings 56 to cause the solid matter and the liquid matter flow through the first pipe section 46 to disperse radially from the first pipe section 46.

The second pipe section 47 has a first end 60, a second end 62, a length, and a diameter, which is greater than the diameter of the first pipe section 46. The second pipe 47 section is concentrically positioned about the first pipe section 46. The outlets 44a and 44b are formed at a lower end of the second pipe section 47 so the solid matter and the liquid matter dispersed from the openings 56 of the first pipe section 46 pass from the gas buster 14 through the outlets 44a and 44b.

The gas busters 14 may include a plate member 68 dividing the first pipe section 46 and the second pipe section 47 into a first gas buster portion 70a and a second gas buster portion 70b with the first gas buster portion 70a is fluidically isolated from the second gas buster portion 70b. Each of the first gas buster portion 70a and the second gas buster portion 70b may be operably connected to a separate well.

Figure 7:
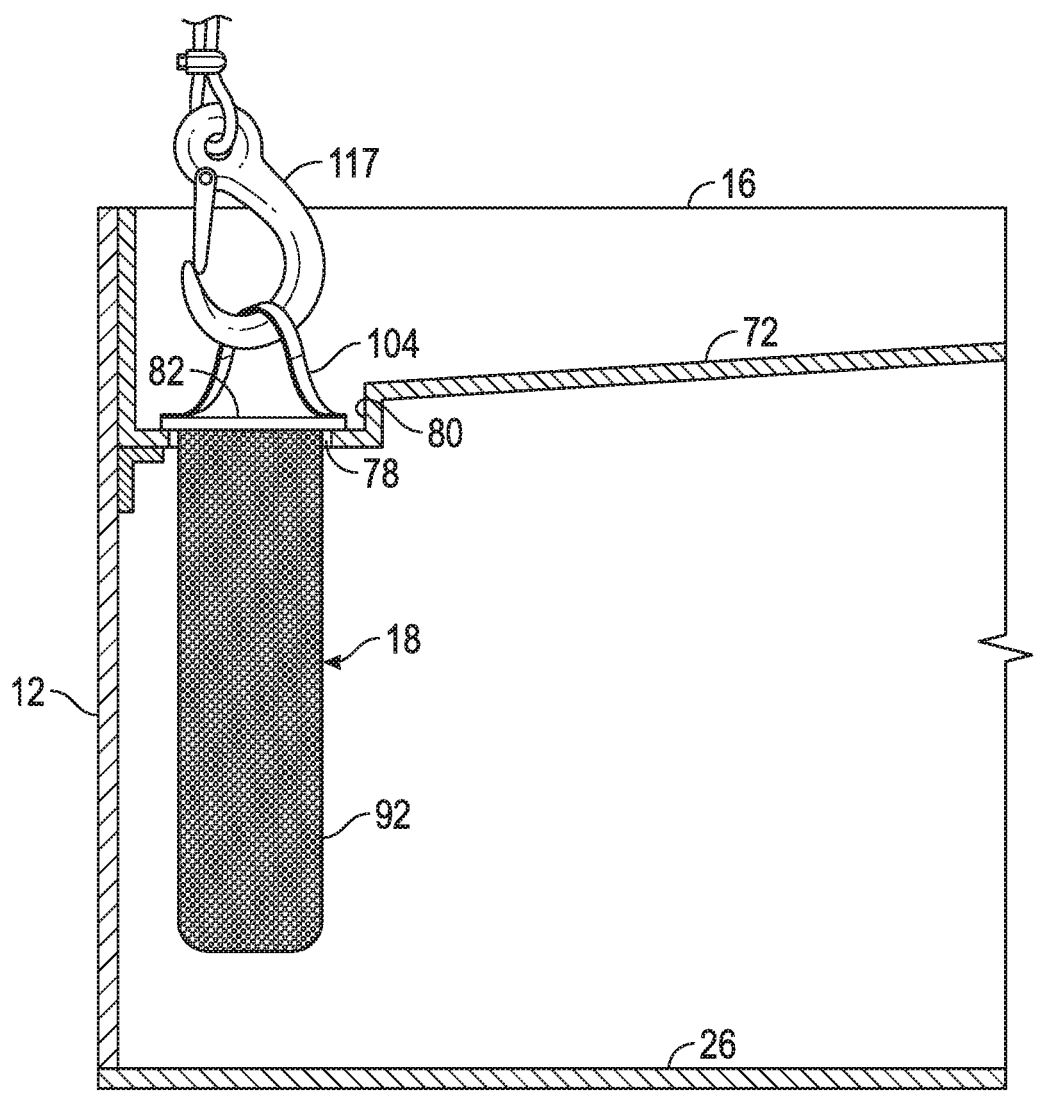
FIG. 7 is a sectional view of the filter assembly positioned in the trough.

The troughs 16 are positioned below the outlets 44a and 44b of the gas busters 14 to collect the water discharged from the gas busters. The troughs 16 may be supported in the container 12 in any suitable manner, such as brackets 71a and 71b (FIG. 3), which are welded to the container 12 and the troughs 16. In the illustrated embodiment, three troughs 16 are shown—one trough 16 corresponding to each gas buster 14. The troughs 16 are spaced a distance from the bottom 26 of the container 12 a sufficient distance to permit the filter assembly 18 to extend downwardly from the trough 16 without contacting the bottom 26 of the container 12 (FIG. 7).

The trough 16 has a bottom 72 sloping from a high end 74 to a low end 76 and an opening 78 at the low end 76. The troughs 16 are configured to capture the water discharged from the corresponding gas buster 14 and direct the water to the opening 78. In one embodiment, the troughs 16 are positioned above the first portion 36 of the container.

The bottom 72 of the trough 16 may include a sump 80 to facilitate passage of fluid to the opening 78. The sump 80 is illustrated has having a square shape, but the shape may be varied.

The opening 78 is vertically offset from the corresponding gas buster 14 so the gas buster 14 does not interfere with insertion and removal of the filter assembly 18.

Figure 6:
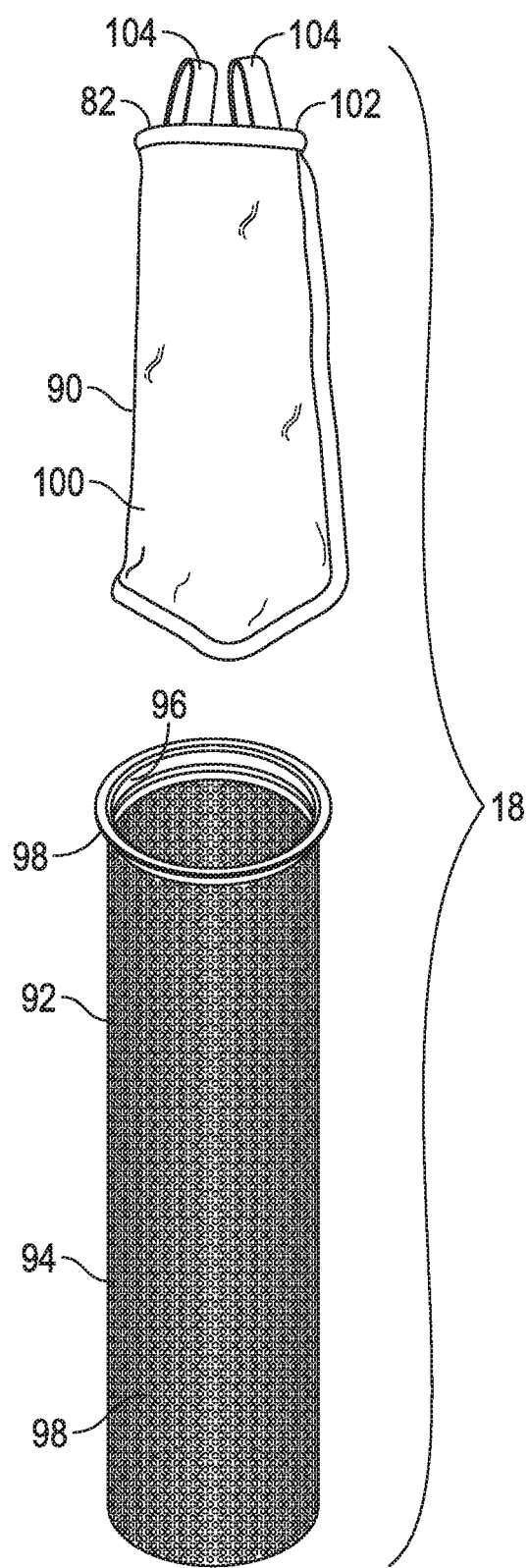
FIG. 6 is an exploded, perspective view of a filter assembly.
Figure 8:
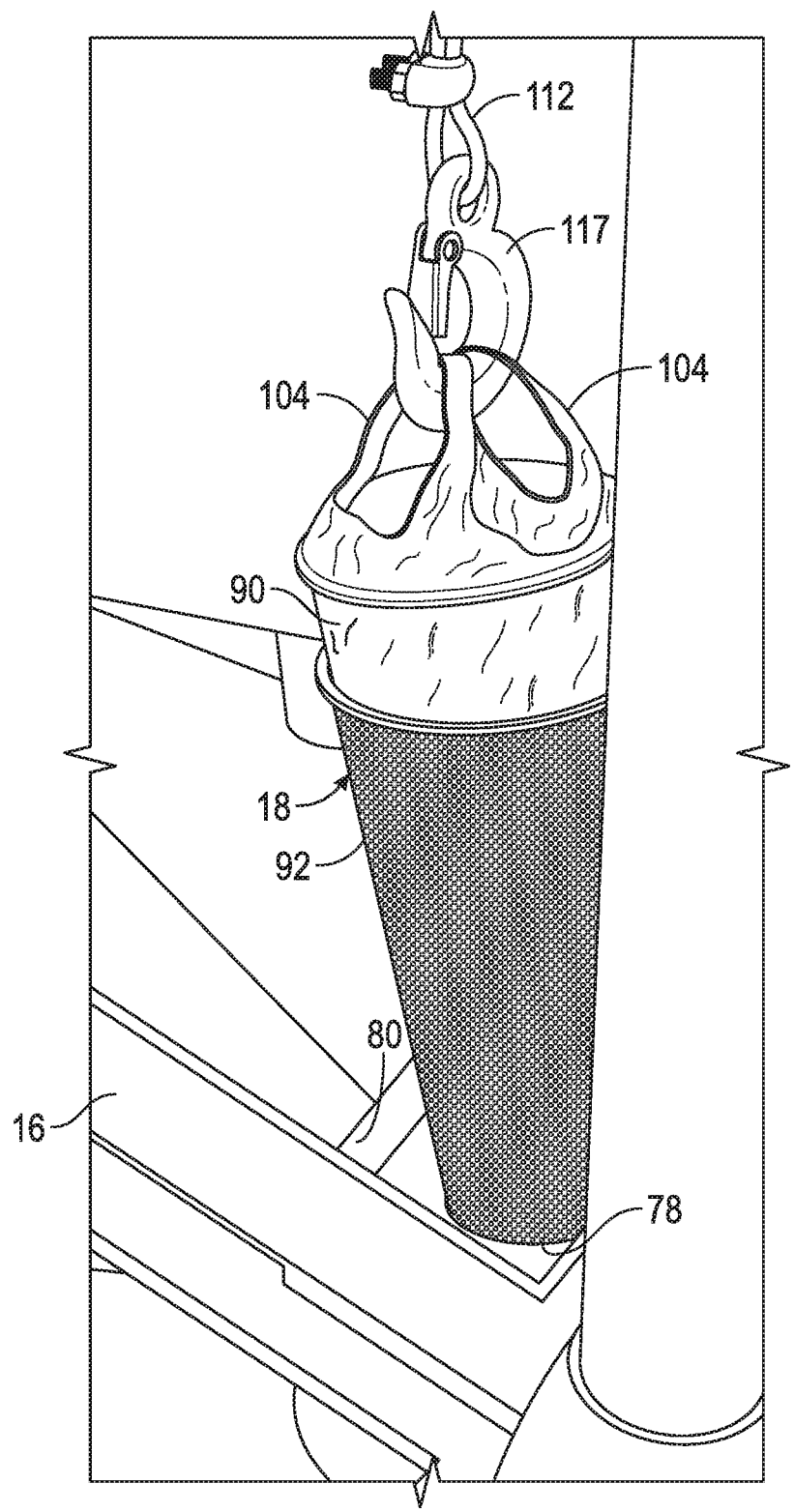
FIG. 8 is a perspective view of the filter assembly being removed from the trough.

Referring now to FIGS. 6-8, the filter assembly 18 has an inlet 82, and the filter assembly 18 is operably fitted to the opening 78 of the trough 16 so the of the inlet 82 of the filter assembly 18 is positionable in a way that the solid matter and the liquid matter passing through the opening 78 of the trough 16 enter the filter assembly 18 wherein the liquid matter passes through the filter assembly 18 and into the container 12 and the solid matter is collected in the filter assembly 18.

In one embodiment, the filter assembly 18 includes a filter 90 and a filter support 92. The filter 90 may be the type known as a filter-sock or filter-bag, and the filter support 92 may be a filter basket or strainer. The filter support 92 has a body 94, which is generally cylindrical in shape, with an open upper end 96. The open upper end 96 has a rim 98 extending radially outwardly to support the filter 90 in a suspended relationship to the trough 16 when the body 94 of the filter support 92 is positioned through the opening 78 of the trough 16. The body 94 of the filter support 92 is provided with a plurality of openings 98 to allow the passage of liquid. In one embodiment, the body 94 has a diameter of approximately six inches, but the diameter can be varied. The length of the body 94 may also be varied, but in one embodiment the body 94 of the filter support 92 is approximately 26.5 inches. To ensure the solid matter and the liquid matter passing through the opening 78 of the trough 16 enter the filter 90, in one embodiment the filter support 92 has a length such that the filter support 92 does not contact the bottom 26 of the container 12 when the filter support 92 is suspended from the trough 16.

The filter 90 is positioned in and supported by the filter support 92. Like the filter support 92, the filter 90 has a body 100 and an open upper end 102, which defines the inlet 82 of the filter assembly 18. The filter 90 is provided with one or more straps 104 to facilitate support of the filter assembly 16 in the trough 16 and removal of the filter 90 from the trough 16 when a selected amount of solid matter has been collected in the filter 90.

In one embodiment, the filter 90 is manufactured using (alone or with a suitable scrim layer) a non-perforated non-woven filter material suitable to capture the size of proppant being used. The filter 90 may be fabricated from any number or types of filter material such as that known as synthetic fibers (e.g., polyester, polypropylene, fiberglass, polyamide or fluorocarbon) having the integrity and micron rating of the filter material chosen for the particular application.

With reference to FIGS. 2 and 3, in one embodiment, the winch 20 is connected to the container 12. In the illustrated embodiment, three winches 20 are shown—one winch 20 corresponding to each gas buster 14 and each trough 16. Each of the winches 20 includes a support member 109 with a spool 110 and hand crank 111 (FIG. 2). In another embodiment, the hand crank can be a motor so the spool 110 is motorized. A cable 112 is operably attached to the spool 110 so as to be let out (wound out) by the spool 110 when the spool 110 winds in a first direction and let in (wound in) when the spool 110 winds in a second direction. The cable 112 operably extends over pulleys 114a and 114b supported by the support member 109. The cable 112 has a distal end 116, which is distal from the support member 109. The distal end 116 is configured to attach to the strap 104 of the filter 90. The distal end 116 can attach to the filter 90 by any suitable means, for example, it can attach by a hook 117.

The support member 109 and the pulleys 114a and 114b are oriented so the cable 112 is vertically aligned with the opening 78 of the trough 16 such that, when the filter 90 is positioned in the opening 78, the filter 90 it is attached to distal end 116 of the cable 112 and may be lifted by the cable 112 while passing to the side of the corresponding gas buster 14. The support member 109 is rotatably connected to the container 12 so the cable 112 can be moved out of alignment with the opening 78 and outside the container 12 with the filter 90 attached the cable 112.

In operation, a fluid having a solid matter and a liquid matter is introduced into one of the gas busters 14 to dissipate energy associated with incoming solid matter and liquid matter. The fluid having the solid matter and the liquid matter may be introduced into the gas buster 14 from a sand separator (not shown).

The solid matter and the liquid matter from the gas buster 14 passes into the corresponding trough 16. The solid matter and the liquid matter from the trough 16 are directed to the opening 78 of the trough 16 and pass through the opening 78 and into the filter 90 so the liquid matter passes through the filter 90 and into the container 12 and the solid matter is collected in the filter 90. The filter 90 is removed from the trough 16 by lifting the filter 90 with the winch 20. The winch 20 is rotated so the filter 90 is positioned outside the container 12 where the amount of solid matter collected is determined and then disposed of. The amount of solid matter collected may be determined in several ways. For example, the filter assembly 18 containing the solid matter may be weighed with a scale (not shown). Alternatively, the amount of solid matter may be estimated based on the level of solid matter in the filter 90.

The liquid collected in the first portion 36 and the second portion 38 of the container 12 may be disposed by truck or pumped to an appropriate facility.

From the above description, it is clear that the inventive concepts disclosed herein are adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope of the inventive concepts disclosed herein and defined by the appended claims.

What is claimed is:

1. An apparatus for separating solid matter from liquid matter, comprising:
    a container with an inner space;
    a gas buster connected to the container and positioned above the inner space thereof to dissipate energy associated with incoming solid matter and liquid matter, the gas buster having at least one inlet and at least one outlet and comprising:
        a first pipe section having a first end, a second end, a length, and a diameter, the inlet formed at the first end of the first pipe section and the first pipe section including a plurality of openings to cause the solid matter and the liquid matter to disperse radially from the first pipe section; and
        a second pipe section having a first end, a second end, a length, and a diameter, the diameter of the second pipe section being greater than the diameter of the first pipe section and the second pipe section being positioned about the first pipe section, the outlet formed at a lower end of the second pipe section so the solid matter and the liquid matter dispersed from the openings of the first pipe section pass from the gas buster through the outlet;
    a trough positioned below the at least one outlet of the gas buster and supported by the container, the trough having a bottom sloping from a high end to a low end and an opening at the low end;
    a winch connected to the container; and
    a filter having an inlet, the filter operably fitted to the opening of the trough so the inlet of the filter is positionable in a way that the solid matter and the liquid matter passing through the opening of the trough enter the filter wherein the liquid matter passes through the filter and into the container and the solid matter is collected in the filter,
    wherein the winch is connected to the filter and is operable to cause the filter to be removed from the container to permit the amount of solid matter collected in the filter to be determined.

2. The apparatus of claim 1, wherein the filter is a filter sock and a filter housing.

3. The apparatus of claim 1, wherein the second pipe section is concentrically positioned about the first pipe section.

4. The apparatus of claim 1, wherein the gas buster has a first end with a first inlet and a second end with a second inlet, and wherein the first inlet is fluidically isolated from the second inlet.

5. The apparatus of claim 4, wherein the first end of the gas buster has a plurality of first outlets, wherein the second end of the gas buster has a plurality of second outlets, wherein the trough is positioned below each of the first outlets and the second outlets.

6. The apparatus of claim 1, wherein the inlet of the first pipe section is a first inlet, wherein the second end of the first pipe section has a second inlet, and wherein the gas buster further comprises a plate member dividing the first pipe section and the second pipe section into a first gas buster portion and a second gas buster portion, the trough positioned below each of the first gas buster portion and the second gas buster portion.

7. An apparatus for separating solid matter from liquid matter, comprising:
    a container with an inner space;
    a plurality of gas busters connected to the container and positioned above the inner space thereof to dissipate energy associated with incoming solid matter and liquid matter, each of the gas busters having at least one inlet and at least one outlet and each gas buster comprising:
        a first pipe section having a first end, a second end, a length, and a diameter, the inlet formed at the first end of the first pipe section and the first pipe section including a plurality of openings to cause the solid matter and the liquid matter to disperse radially from the first pipe section; and
        a second pipe section having a first end, a second end, a length, and a diameter, the diameter of the second pipe section being greater than the diameter of the first pipe section and the second pipe section being positioned about the first pipe section, the outlet formed at a lower end of the second pipe section so the solid matter and the liquid matter dispersed from the openings of the first pipe section pass from the gas buster through the outlet;
    a plurality of troughs, each of the troughs positioned below a respective one of the outlet of the gas buster and supported by the container, each of the troughs having a bottom sloping from a high end to a low end and an opening at the low end;
    a plurality of winches connected to the container; and
    a plurality of filters, each of the filters having an inlet, each of the filters operably fitted to the opening of a respective one of the troughs so the inlet of the filter is positionable in a way that the solid matter and the liquid matter passing through the opening of the trough enters the filter wherein the liquid matter passes through the filter and into the container and the solid matter is collected in the filter,
    wherein each of the winches is connected to a respective one of the filters and is operable to cause the filter to be removed from the container to permit the amount of solid matter collected in the filter to be determined.

8. The apparatus of claim 7, wherein each of the filters is a filter sock and a filter housing.

9. The apparatus of claim 7, wherein the second pipe section is concentrically positioned about the first pipe section.

10. The apparatus of claim 7, wherein each of the gas busters has a first end with a first inlet and a second end with a second inlet, and wherein the first inlet is fluidically isolated from the second inlet.

11. The apparatus of claim 10, wherein the first end of each of the gas busters has a plurality of first outlets, wherein the second end of each of the gas busters has a plurality of second outlets, wherein a respective one of the troughs is positioned below each of the first outlets and the second outlets of one of the gas busters.

12. The apparatus of claim 7, wherein the inlet of the first pipe section is a first inlet, wherein the second end of the first pipe section has a second inlet, and wherein each of the gas busters further comprises a plate member dividing the first pipe section and the second pipe section into a first gas buster portion and a second gas buster portion, wherein a respective one of the troughs is positioned below each of the first gas buster portion and the second gas buster portion of one of the gas busters.

* * * * *